Patented July 16, 1935

2,008,478

UNITED STATES PATENT OFFICE 2,008,478

METHOD OF PREPARING PHOSPHORIC ACID ESTERS OF ALIPHATIC ALCOHOLS

Byron M. Vanderbilt and Hans B. Gottlieb, Chicago Heights, Ill., assignors to Victor Chemical Works, a corporation of Illinois No Drawing. Application June 13, 1934, Serial No. 730,520

11 Claims. (Cl. 260—99.20)

This invention relates to an improved method of preparing phosphoric acid esters of aliphatic alcohols.

It has been heretofore suggested that neutral phosphoric acid esters of certain primary alcohols, such as butyl alcohol, might be prepared by the interaction of phosphorus oxychloride and the alcohol at low temperatures to form the di-substitution product, followed by heating at relatively elevated temperatures to form the tri-substitution product. In carrying out such a method the hydrogen chloride gas formed as a by-product in the initial reaction reacts to a considerable extent with the alcohol, and at the same time there are other side reactions which occur at the advanced temperatures which are used for the substitution of the third alkoxy group. In order to drive the reaction to completion it has been suggested that a very large excess of the alcohol be used, but this does not greatly affect the side reactions. It has been further suggested to remove part of the hydrogen chloride during the reaction by the use of heat and vacuum, but this is impractical because of the corrosive nature of the hydrogen chloride and because of the difficulty in removing more than a minor proportion of such hydrogen chloride.

While it has heretofore been believed necessary to use an elevated temperature for the substitution of the third alkoxy group, it has now been discovered that the substitution may be completed at temperatures below 20° C. providing a long digestion period is used. It has further been discovered that by proceeding at such low temperatures, and digesting until the reaction is complete, the deleterious effect of the hydrochloric acid gas may be avoided, and an increased yield of the phosphoric acid esters obtained in pure state. At the same time better than 99% of the excess alcohol may be recovered.

It has been further discovered that during the formation of the trialkyl phosphates at low temperatures it is unnecessary to remove the hydrogen chloride, and that after the reaction is complete the hydrogen chloride may be removed from the reaction product without the necessity of utilizing heat, thus avoiding substantially all side reactions due to hydrogen chloride.

In carrying out the invention, phosphorus oxychloride and a primary aliphatic alcohol are mixed, the temperature being maintained below 20° C., and the mixture is maintained for a period of 24-72 hours at or below this temperature.

After the reaction is complete the hydrogen chloride is removed from the mixture by the addition of an alkali and sufficient water to initiate the reaction between the alkali and the hydrogen chloride. The hydrogen chloride is thus neutralized, forming water and an alkali chloride, the latter forming a voluminous precipitate which may be filtered off. The filtrate, containing the phosphoric ester, any excess of alcohol, and a slight amount of water saturated with alkali chloride, may now be heated, first removing the alcohol-water fraction, and finally the tri-alkyl ester, without danger of side reactions due to the hydrogen chloride.

In connection with alcohols forming azeotropic mixtures with water, the alcohol may be recovered in anhydrous form by fractionation.

The following are examples of the invention:

1. 1800 grams of butanol (normal butyl alcohol) were placed in a 3 liter three-necked flask equipped with a stirrer, thermometer and separatory funnel. The flask was cooled externally to a temperature below 15° C. and 460 grams of phosphorus oxychloride (B. P. 105–107° C.) added slowly over a period of one hour. The flask and its contents were maintained at a temperature between 15 and 20° C. for a period of over 48 hours to complete the reaction. The mixture was then externally cooled to about zero degrees and 400 grams of ice added. Sufficient heat was evolved as the hydrogen chloride partially dissolved in the ice water, to completely melt the ice and raise the tempeature to about 10° C. Then 477 grams of soda ash were slowly added under good agitation to prevent foaming losses. After the addition of the soda ash was complete the mixture was no longer cooled, but was stirred vigorously for 15 minutes to get the last traces of the soda ash to react. The sodium chloride precipitate was quite voluminous and absorbed most of the water, the mixture separating into two layers. The oil layer which was partially saturated with aqueous sodium chloride solution was decanted from the precipitate. The precipitate with adhering liquid was poured onto a filter and sucked as dry as possible. The water layer in the filtrate was then separated by means of a separatory funnel, and the combined amounts of oil from this separation and the decantation were placed in a distillation flask. This oily liquid consisting of the tributyl phosphate, excess butanol, aqueous salt (NaCl) solution dissolved in the mass, and any traces of mono and dibutyl phosphates which might have been formed were subjected to fractional distillation under a vacuum of about 150 mm. Hg pressure, the water-butanol fraction distilling off first followed by anhydrous butanol and finally the tributyl phosphate is distilled over at a temperature of 147° C. after increasing the vacuum to about 9 mm. of Hg pressure. The residue in the still contains the sodium chloride impurity and the traces of any mono or dibutyl phosphates which might have been formed.

In accordance with this procedure tributyl phosphate yields of 88 to 95% may be easily attained with better than a 99% recovery of the excess butanol used.

2. 1440 grams of anhydrous normal propyl alcohol were maintained at a temperature below 10° C. and 460 grams of phosphorus oxychloride added under good agitation. The mixture was maintained at 10° C. for 18 hours and at 15° C. for 44 hours and a separation of the hydrogen chloride in the manner described in Example 1 was made and the product worked up by fractionation to yield 567 grams of tri-n-propyl phosphate (B. P. 119° C. at 9 mm. Hg pressure) or 85% on the basis of the oxychloride used. 98 to 99% of the excess propyl alcohol can be recovered by fractionation.

3. 448 grams iso-amyl alcohol were cooled to 10° C. and 102 grams of phosphorus oxychloride slowly added. The mixture was maintained at 10° C. for 2 hours and 15° C. for 45 hours, and then treated in the manner described in Example 1 to remove the hydrogen chloride and separate the excess of alcohol from the product. An 86% yield of tri-isoamyl phosphate (B. P. 143° C. at 3 mm. Hg pressure) was obtained in this particular experiment.

It is preferred to use alcohols which form phosphoric acid esters that are insoluble in water in order to avoid hydrolysis of such esters. However, very good yields of tri-ethyl phosphate may be obtained by this method, without apparent substantial hydrolysis in spite of the solubility of the ester. It is also preferred to use primary alcohols, owing to the greater activity of the secondary and tertiary alcohols toward hydrogen chloride.

The foregoing detailed description has been given for clearness of understanding only, and no unnecessary limitations should be understood therefrom, but the appended claims should be construed as broadly as permissible, in view of the prior art.

What we claim as new and desire to secure by Letters Patent, is:

1. A process for the production of neutral phosphoric esters of aliphatic alcohols which comprises mixing phosphorus oxychloride with a primary aliphatic alcohol, digesting the mixture until the reaction is substantially complete, whereby a phosphoric ester and hydrogen chloride are formed, neutralizing the hydrogen chloride with an alkaline alkali metal compound, the temperature being maintained below 20° C. during all of said steps, and separating the phosphoric ester from the reaction mixture.

2. The method as set forth in claim 1, in which the digestion is continued for a period of at least 24 hours.

3. The method as set forth in claim 1, in which the alcohols are primary aliphatic alcohols having at least two carbon atoms.

4. The method as set worth in claim 1, in which the alcohols have at least two carbon atoms, and in which a small amount of water is added to initiate the reaction between the hydrogen chloride and the alkaline agent.

5. The method for the production of neutral phosphoric acid esters which comprises mixing phosphorus oxychloride with a primary aliphatic alcohol containing two or more carbon atoms, digesting the mixture until the reaction to form the phosphoric ester is substantially complete, adding a small amount of water and an alkaline alkali metal compound to neutralize the hydrogen chloride resulting from the esterification, the temperature being maintained below 20° C. during said steps, and separating the resulting alkali metal chloride from the reaction product.

6. The method as set forth in claim 5, in which the alkaline agent is soda ash.

7. The method as set forth in claim 5, in which excess alcohol is used and the excess is recovered by fractional distillation from the reaction mass after separation of the chloride.

8. The method as set forth in claim 1, in which the alcohol is a primary butyl alcohol and the product is tributyl phosphate.

9. The method as set forth in claim 1, in which the alcohol is a primary amyl alcohol and the product is triamyl phosphate.

10. The method as set forth in claim 1 in which the alcohol is primary propyl alcohol and the product is tripropyl phosphate.

11. The method as set forth in claim 5, in which the water does not exceed 20% by weight on the basis of the total reaction mass.

BYRON M. VANDERBILT.
HANS B. GOTTLIEB.